W. C. McCULLOUGH.
PNEUMATIC SPRING.
APPLICATION FILED NOV. 25, 1907.
904,352.
Patented Nov. 17, 1908.
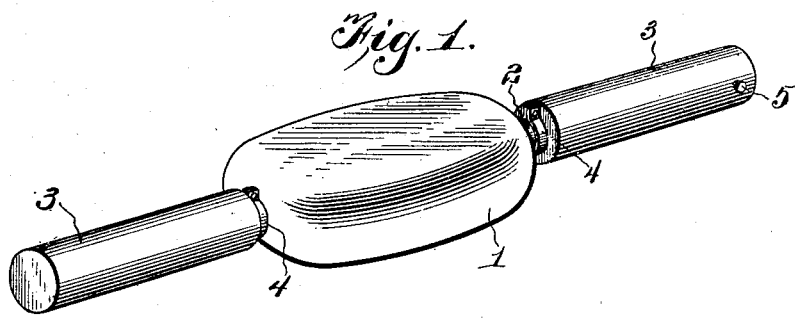
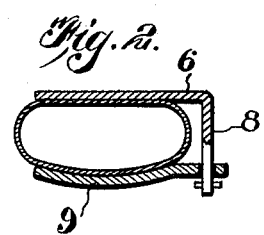
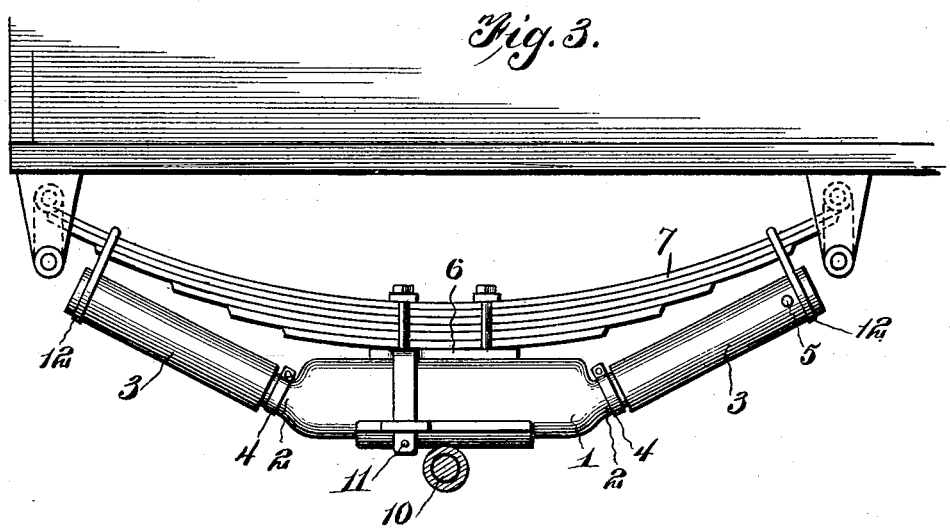
Witnesses
Louis R. Heinrichs
C. H. Griesbauer
Inventor
William C. McCullough
By H. B. Willson & Co.
Attorneys

UNITED STATES PATENT OFFICE.

WILLIAM C. McCULLOUGH, OF BUCYRUS, OHIO.

PNEUMATIC SPRING.

No. 904,352.  Specification of Letters Patent.  Patented Nov. 17, 1908.

Application filed November 25, 1907. Serial No. 403,765.

*To all whom it may concern:*

Be it known that I, WILLIAM C. MCCULLOUGH, a citizen of the United States, residing at Bucyrus, in the county of Crawford and State of Ohio, have invented certain new and useful Improvements in Pneumatic Springs; and I do declare the following to be a full, clear, and exact description of the invention, such as will enable others skilled in the art to which it appertains to make and use the same.

My invention relates to cushioning devices, and more especially to pneumatic cushioning springs for vehicles.

The object of the invention is to take up heavy jolts which are frequently contended with in rough road work and which are usually so powerful that the springs are not strong enough to sustain the body. These springs are usually seated underneath the main elliptical springs and are preferably composed of some flexible non-expansible material which will allow the compression of the air but which will not expand upon flexing. In all of these devices the resiliency is limited to the amount of air within the device and, therefore, unless rather larger and cumbersome, are not practical for all purposes.

My invention is designed to obviate this difficulty and consists in attaching to the cushion proper an inflexible overflow tube which will receive the compressed air from the bag when pressure is exerted thereon and return it to the bag when the pressure is relieved.

With these objects in view, the invention consists of certain novel features of construction, combination and arrangement of parts as will be described hereinafter and particularly pointed out in the appended claims.

In the accompanying drawings, Figure 1 is a perspective view of the cushion and its associated parts removed from the vehicle; Fig. 2 is a sectional view taken through the air cushion, the spring plate and the axle plate; and Fig. 3 is a side elevation of the device applied to a vehicle and showing the axle in section and the wheel removed.

Referring more especially to the drawings, 1 represents a bag of suitable material which has perfect flexibility, but whose fabric is inexpansible. The bag has reduced ends, 2, which are secured to the metallic cylinders, 3, by a clamp member, 4. One of the cylinders is provided with a valve, 5, by which air may be admitted to the casing so as to inflate the device to the required degree.

In Figs. 2 and 3 I show the manner of mounting the device, wherein 6 indicates the upper plate which is attached to the usual elliptical spring, 7, and has depending therefrom a right-angular arm, 8, passing through a slot in an axle plate, 9, secured to the axle 10. A pin 11 extends through the arm 8 and prevents the accidental displacement of the plate, 6. The cylinders are secured to the opposite ends of the elliptical spring by metallic bands 12, which surround the cylinders and are clamped to the springs in any suitable manner. The plate 9 is preferably elongated and concaved so as to provide a seat for the bag.

From the above description it will be seen that by the use of the inelastic cylinders, I am enabled to carry more air, and thereby obtain greater resiliency than would be the case where only the individual bag is used.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus fully described my invention, what I claim as new, and desire to secure by Letters-Patent, is:

1. In a device of the class described, the combination with a vehicle axle and vehicle spring, of plates carried by both, a flexible bag located between the plates, and inflexible reservoir tanks attached to the bag and supported by the springs.

2. In a device of the class described, the combination with a vehicle axle and a vehicle spring, of a flat plate carried by the latter, an elongated concaved plate carried by the former, an inflated bag between the plates adapted for compression thereby, and a pair of inflexible cylinders, one end of said cylinders being carried by the bag, and the other ends being secured to the outer ends of the spring.

In testimony whereof I have hereunto set my hand in presence of two subscribing witnesses.

WILLIAM C. McCULLOUGH.

Witnesses:
SAMUEL LENTHOLD,
SUE MARKLEY.